United States Patent
Mangin (10) Patent No.: US 9,130,676 B2
(45) Date of Patent: Sep. 8, 2015

(54) TRANSPARENT PROTECTION SWITCHING OPERATION IN A PON

(71) Applicant: Christophe Mangin, L'Hermitage (FR)

(72) Inventor: Christophe Mangin, L'Hermitage (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 13/743,786

(22) Filed: Jan. 17, 2013

(65) Prior Publication Data

US 2013/0195439 A1    Aug. 1, 2013

(30) Foreign Application Priority Data

Jan. 30, 2012  (EP) .................... 12305114

(51) Int. Cl.
*H04B 10/27*  (2013.01)
*H04Q 11/00*  (2006.01)
*H04B 10/032*  (2013.01)
*H04B 10/272*  (2013.01)

(52) U.S. Cl.
CPC .............. *H04B 10/27* (2013.01); *H04B 10/032* (2013.01); *H04B 10/272* (2013.01); *H04Q 11/0067* (2013.01); *H04J 2203/006* (2013.01); *H04J 2203/0067* (2013.01); *H04Q 2011/0081* (2013.01)

(58) Field of Classification Search
CPC .................. H04Q 11/0067; H04Q 2011/0064; H04Q 2011/0081
See application file for complete search history.

(56) References Cited

U.S. PATENT DOCUMENTS

| | | | |
|---|---|---|---|
| 8,724,453 B2 * | 5/2014 | Sun et al. ....................... | 370/220 |
| 2006/0239285 A1 * | 10/2006 | Nomura et al. ................ | 370/408 |
| 2007/0140288 A1 * | 6/2007 | Boyd et al. .................... | 370/442 |
| 2010/0098407 A1 * | 4/2010 | Goswami et al. ................ | 398/5 |
| 2011/0188849 A1 * | 8/2011 | Haramaty et al. .............. | 398/25 |
| 2013/0177314 A1 * | 7/2013 | Mizuguchi et al. ............. | 398/66 |
| 2013/0256423 A1 * | 10/2013 | Lord et al. .................... | 237/2 A |

* cited by examiner

*Primary Examiner* — Nathan Curs
(74) *Attorney, Agent, or Firm* — Oblon, McClelland, Maier & Neustadt, L.L.P.

(57) ABSTRACT

The invention relates to a method for performing a switch operation between a first Optical Line Terminal OLT and a second OLT in a Passive Optical Network PON, said first and second OLTs being connected to a plurality of Optical Network Units ONUs through at least one splitter. The invention enables to avoid the detection of a timestamp drift error during protection switching operation by modifying the threshold of the detection in the second OLT.

15 Claims, 3 Drawing Sheets

TRANSPARENT PROTECTION SWITCHING OPERATION IN A PON

BACKGROUND OF THE INVENTION

1. Technical Field

The present invention generally relates to access networks and more precisely to Passive Optical Networks (PON).

It finds applications, in particular, in Ethernet Passive Optical Networks (EPON) for point to multi-point communications between a terminal and a plurality of units.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Automatic line protection can be implemented in telecommunication networks as a mean to dynamically provide an alternative path between two end points in case of a link failure.

Generally, the two end points of a network segment are connected via two independent links, only one of which being active at a given time. The active link is called working link in what follows. The other link is called back-up link and is kept idle as long as the working link is operational.

Upon detection of a failure or of degradation on the working link, both end points synchronize a switch operation from the working link to the back-up link. For that purpose, both end points can run a given protocol in order to:

share and confirm the failure or degradation detection;
carry out a switch operation between the working link and the back-up link;
confirm that the switch operation is effective.

Upon successful switch operation, the back-up link becomes the working link and the working link is put to an idle state in order to perform a restoration operation.

Usually, the failure or degradation criteria include the following conditions:

signal failure such as loss of signal, loss of frame, bit error rate that is significantly higher than a given higher threshold;
signal degradation: bit error rate greater than a given lower threshold.

Where usually, line protection is applied to point-to-point network segments, protection in Passive Optical Networks (PON) takes a different shape due to the topology of the PON.

A PON is a single, shared optical fiber that uses inexpensive optical splitters to divide the single fiber from a Central Office (CO) into separate strands feeding individual subscribers. In such networks, information is carried by laser bursts. PONs are called 'passive' because there are no active electronics within the access network, except at subscriber endpoints and at the CO. The single fiber is divided by a passive splitter. The architecture of a PON is called a PON tree in what follows.

Ethernet Passive Optical Network (EPON) is based on Ethernet standard, unlike other PON technologies, which are based on Asynchronous Transfer Mode (ATM) standard. EPON enables to utilize the economies-of-scale of Ethernet and provides simple and easy-to-manage connectivity to Ethernet-based IP (for 'Internet Protocol') equipment, both at the subscriber endpoints and at the CO.

In such networks, the information is exchanged between layers on a per packet basis. Each packet received in a given layer is encoded with a set of encoding parameters specific to this layer. These parameters should be given through network administration means. A Data Link layer is in charge of sharing the physical resource between the subscriber endpoints and the CO. The Data Link layer is composed by two sub-layers namely the Logical Link (LL) layer and the Medium Access Control (MAC) layer. A Physical layer translates logical communications requests from the Data Link layer into hardware-specific operations to affect transmission or reception of electronic signals.

The IEEE 802.3ah EPON specification, which is also called Gigabit EPON (GEPON), defines Multi-Point Control Protocol (MPCP), Point-to-Point Emulation (P2PE) and Physical layer for 1 Gigabit EPON system (meaning that 1 Gigabit of data is transmitted in the network per second). The IEEE 802.3av specification defines extensions (mainly concerning the Physical layer) for 10 Gigabit EPON. At least, the Standard for Service Interoperability in Ethernet Passive Optical Networks (SIEPON) group, also referenced P1904.1, describes system-level requirements needed to ensure service-level, multi-vendor interoperability of EPON equipment. These specifications complement the existing IEEE Standard 802.3 and IEEE Standard 802.1, which ensure the interoperability at the Physical layer and the Data Link layer.

An EPON network usually includes an Optical Line Terminal (OLT), which can be included in the CO, and one or more Optical Network Unit (ONU), which can be in charge of one or more subscribers of the EPON. The number of ONU managed by each OLT is between four and sixty-four in current deployments.

To control a Point-to-Multi-Point (P2MP) fiber network, EPON uses the MPCP. MPCP performs bandwidths assignment, bandwidth polling, auto-discovery and ranging. MPCP is implemented in the MAC layer, introducing the 64-byte Ethernet control messages:

GATE and REPORT messages are used to assign and request bandwidth;
REGISTER message is used to control auto-discovery process.

The MAC layer is in charge of transmission arbitration that is allowing a given ONU to enable transmission from its peer for a predetermined interval of time (also called transmission window or timeslot). Start and length of the transmission windows dedicated to each ONU are defined by a Dynamic Bandwidth Allocation (DBA) scheduler comprised in the OLT.

GATE message is sent from the OLT to a given ONU and is used to assign one or several transmission window to that ONU.

REPORT message is a feedback mechanism used by an ONU to indicate its buffer occupancy (meaning the length of a queue of waiting data packets to be sent by the ONU) to the OLT, so that the DBA scheduler can define transmission windows that are adapted to the buffer occupancies of the ONUs.

The IEEE SIEPON defines two types of optical line protection schemes: trunk protection and tree protection.

Figure 1:
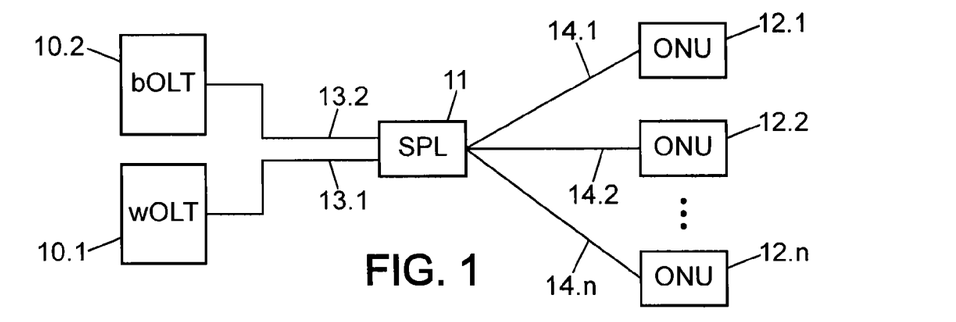
FIG. 1 represents a PON in a trunk configuration according to the prior art.

Referring to FIG. 1, there is shown a trunk protection scheme in a PON.

A working OLT 10.1 is connected to a plurality of n ONUs 12.1-12.n via a passive optical splitter 11. The working OLT 10.1 is connected to the passive optical splitter 11 via a first network segment 13.1. A back-up OLT 10.2 is also connected to the plurality of ONUs 12.1-12.n via the passive optical splitter 11. The back-up OLT 10.2 is connected to the passive optical splitter 11 via a second network segment 13.2.

The passive optical splitter 11 is connected to each of the ONUs 12.1-12.n via one of the network segments 14.1-14.n.

Thus, the passive optical splitter 11 is arranged to split the first and second network segments 13.1 and 13.2 into n network segments 12.1-12.n. Thus, the single passive optical splitter 11 can be used in the trunk protection scheme.

According to the trunk protection scheme, only the working OLT 10.1 is protected against failure, as well as the first network segment 13.1 spanning from the working OLT 10.1 to the passive optical splitter 11. The first and second network segments 13.1-13.2 together represent the trunk of a PON tree.

Figure 2:
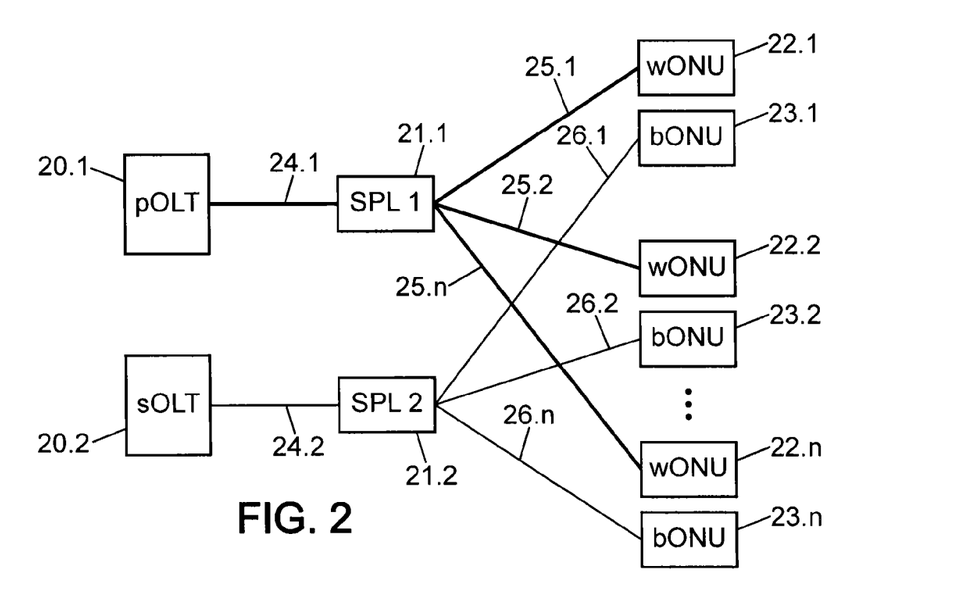
FIG. 2 represents a PON in a tree configuration according to the prior art.

Referring now to FIG. 2, there is shown a tree protection scheme in a PON.

A primary OLT 20.1 having the same role as the working OLT 10.1 in the trunk protection scheme, is connected to a plurality of n working ONUs 22.1-22.n via a primary passive optical splitter 21.1. The primary OLT 20.1 is connected to the primary passive optical splitter 21.1 via a first network segment 24.1 and the primary passive optical splitter 21.1 is connected to each of the n working ONUs 22.1-22.n via one of network segments 25.1-25.n.

The primary passive optical splitter 21.1 is arranged to split the first network segment 24.1 into n network segments 25.1-25.n.

A secondary OLT 20.2 having the same role as the back-up OLT 10.2 in the trunk protection scheme, is connected to a plurality of n back-up ONUs 23.1-23.n via a secondary passive optical splitter 21.2. The secondary OLT 20.2 is connected to the secondary passive optical splitter 21.2 via a second network segment 24.2 and the secondary passive optical splitter 21.2 is connected to each of the n back-up ONUs 23.1-23.n via one of network segments 26.1-26.n.

The secondary passive optical splitter 21.2 is arranged to split the second network segment 24.2 into n network segments 26.1-26.n.

According to the tree protection scheme, the PON tree is fully duplicated. Thus, the primary OLT 20.1 and the n working ONUs 22.1-22.n are protected.

The EPON protocol implements a specific procedure for the OLT to discover the ONUs it is connected to. This specific procedure is called a discovery procedure, during which the OLT determines:
- the ONUs connected to the PON tree;
- a Round Trip Time (RTT) characterising the optical path between the OLT and each ONU.

In addition, the OLT imposes a common time reference or clock to all ONUs. The synchronisation of the ONU clock with the OLT clock is maintained during normal operation by time-stamping particular protocol messages that are exchanged at a mandatory minimum frequency so that clock drift cannot occur.

An ONU that has been discovered during a discovery procedure and for which the clock is correctly synchronized with the OLT clock is said to be in a registered state.

An ONU can be deregistered upon explicit decision of the OLT, through a specific protocol procedure, or implicitly upon detection of the following two conditions:
clock desynchronization, i.e. the timestamp indicated by the OLT in the time-stamped protocol messages received by the ONU differs by a too big difference with the timestamp locally maintained in the ONU. This first condition is called "timestamp drift error" condition The "timestamp drift error" condition is defined in the IEEE 802.3 specification, section 5, clause 64.2.1.1 as following: "A condition of timestamp drift error occurs when the difference between OLT's and ONU's clocks exceeds some predefined threshold. This condition can be independently detected by the OLT or an ONU. The OLT detects this condition when an absolute difference between new and old RTT values measured for a given ONU exceeds the value of guardThresholdOLT (see 64.2.2.1), as shown in FIG. 64-10. An ONU detects the timestamp drift error condition when absolute difference between a timestamp received in an MPCPDU (Multi-Point Control Protocol Data Unit) and the local-Time counter exceeds guardThresholdONU (see 64.2.2.1), as is shown in FIGS. 64-10 and 64-11"; or
no control message has been received by the ONU (GATE message) or by the OLT (REPORT message) for more than a predefined duration, called "mpcp_timeout", which can be equal to one second (second condition).

These two conditions mean that if a GATE or REPORT message exchange occurs at least every second without clock drift between an ONU and the OLT, the ONU remains in registered state.

If not, the ONU transitions to a deregistered state and a complete discovery procedure has to be started over to re-register the ONU.

In order to avoid detection of timestamp drift error condition during operating of the trunk protection scheme, an intermediate state between the registered state and the deregistered state has been introduced in IEEE1904.1 specification.

In Holdover state, the ONU freezes the state of any timeout watchdogs (in particular the timeout watchdog dedicated to the detection of the timestamp drift error condition) and sets the timeout watchdogs to their default values (initial values) when leaving the Holdover state back to the registered state. The ONU does not transmit any upstream data when the ONU is in the Holdover state. Thus, all pending transmission grants (allocated via GATE messages) to a given ONU are purged upon transition in the Holdover state by the ONU, and the ONU waits for new transmission once the transition from the Holdover state to the registered state is completed. The back-up OLT is then in charge of providing new transmission grants to the ONU.

Thus, the Holdover state does not enable any continuity in upstream transmission as the ONU in the Holdover state can not transmit any data in upstream.

There is a need to enable a protection that is common for trunk and tree schemes and that is transparent from the point of view of the ONUs.

SUMMARY OF THE INVENTION

To address these needs, a first aspect of the present invention relates to a method for performing a switch operation between a first Optical Line Terminal OLT and a second OLT in a Passive Optical Network PON, the first and second OLTs being connected to a plurality of Optical Network Units ONUs through at least one splitter, the first OLT and second OLT being arranged to allocate resources to the plurality of ONUs by sending GATE messages, the first OLT being by default in charge of sending GATE messages, resources being used by each ONU to transmit data or REPORT messages, each ONU from the plurality of ONUs being by default in a registered state in which the ONU is allowed to send REPORT messages or data after allocation of resources to the ONU, the REPORT message being sent to the first or the second OLT in order to require resource allocations, each REPORT message being time stamped by the ONU with a first timestamp, the first timestamp representing the local time at which the REPORT message is sent, each given ONU being adapted to be switched in a deregistered state by a given OLT when, upon reception by the given OLT of a REPORT message from the given ONU, a difference between a current Round Trip Time RTT and a previous RTT is greater than a first threshold of the given OLT, the current RTT being determined based on the first timestamp of the REPORT message and a local clock time of the given OLT, and the previous RTT being the current RTT determined for a previously received REPORT message, an ONU in a deregistered state being not allowed to transmit REPORT messages nor data to the first or second OLT, and the first threshold of the second OLT being initially set to a first initial value.

To perform a switch between the first OLT and the second OLT for at least one first ONU from the plurality of ONUs, the method is performed by the second OLT and comprises:

setting the first threshold of the second OLT to a value at least equal to a predefined maximum value of the difference between a current round trip time and a previous round trip time;

sending a GATE message to said first ONU to allocate resources to the first ONU;

and, after the reception of a REPORT message from the first ONU:

setting the first threshold of the second OLT to the first initial value.

The present invention enables to avoid deregistering an ONU during a switching operation from a first OLT to a second OLT. During the switching operation, the first ONUs remains in a registered state, without having to create a Holdover threshold. The inhibition of the detection of the timestamp drift error by the second OLT is permitted by fixing the first threshold to a value that cannot be reached whatever the difference between the current RTT and the previous RTT is. The first threshold is then reset to its initial value so that the efficiency of the PON is not affected. In addition, the method according to the invention is compatible with both tree and trunk configurations. The first OLT can then refer to a primary OLT or to a working OLT and the second OLT can refer to a secondary OLT or to a back-up OLT. The initial value of the first threshold can for example be the "guardThresholdOLT" defined in the IEEE802.3 standard.

According to some embodiments, each GATE message sent by a given OLT being time stamped with a second timestamp of the given OLT, and each given ONU being adapted to switch in the deregistered state when, upon reception of a given GATE message by the given ONU from the given OLT, the absolute value of the difference between the second timestamp of the given GATE message and a local clock time of the given ONU is greater than a second threshold of the given ONU, the second threshold being initially set to a second initial value, the method further comprises, before sending a GATE message to the first ONU:

sending a first message to the first ONU, the first message being adapted to set the second threshold of the first ONU to a value at least equal to a predefined maximum difference between a local clock time and a second timestamp.

Thus, the present invention further enables the inhibition of the detection of the timestamp drift error by the ONU, which is permitted by fixing the second threshold to a value that cannot be reached whatever the difference between the local clock time and the second timestamp is.

In complement, the method further comprises, after the reception of the REPORT message from the first ONU:

sending a second message to the first ONU, the second message being adapted to set the second threshold of the first ONU to the second initial value.

Thus, the second threshold is then reset to its initial value so that the efficiency of the PON is not affected, upon reception of the second message of the second OLT. The second message is sent by the second OLT when the switching between the first and second OLTs has been performed for the first ONU, so that the ONU can be reset to its initial configuration. The initial value of the second threshold can for example be the "guardThresholdONU" defined in the IEEE802.3.

Alternatively, a given duration being predefined, upon reception of the first message, the first ONU can set a timer to zero. The second threshold of the first ONU can then be reset by the first ONU to the second initial value when the timer reaches the predefined duration. These embodiments enable to reduce the number of OAM messages exchanged between the OLTs and the ONUs. The predefined duration can correspond to a maximum duration required for performing a switch between the first and second OLTs for example.

In complement, upon reception of the GATE message by the first ONU, a local clock of the first ONU is reset based on the second timestamp of the GATE message and the first timestamp of the REPORT message is determined based on the local clock of the first ONU.

Thus, no timestamp drift error can be detected upon reception of the first GATE message and the ONU can be synchronized on the OLT's local clock upon reception of the first GATE message.

According to some embodiments, the first and second OLTs being connected to the plurality of ONUs through a unique splitter, the first OLT being connected to the unique splitter via a first network segment, the second OLT being connected to the unique splitter via a second network segment, and the unique splitter being connected to each of the ONUs via a network segment, the switching between the first OLT and the second OLT is performed for all the ONUs of the plurality of ONUs.

The present invention is thus compatible with a trunk configuration of the PON.

Alternatively, the first OLT being connected to a first subset of working ONUs from the plurality of ONUs via a first splitter and the second OLT being connected to a second subset of back-up ONUs from the plurality of ONUs via a second splitter, each working ONU being associated with a corresponding back-up ONU, the switch between the first OLT and the second OLT is performed for at least a first working ONU and a first back-up ONU associated to the first working ONU and is initiated by the first OLT upon detection of a failure between the first working ONU and the first OLT or upon reception of an identifier of the first working OLT by an external entity.

The method further comprises, before setting the first threshold of the second OLT:

receiving an identifier of the first working ONU from the first OLT, determining the first back-up ONU that is associated with the first working ONU, The GATE message is sent to the determined first back-up ONU and the REPORT message is received from the determined back-up ONU.

The present invention is thus compatible with a tree configuration of the PON.

According to some embodiments, the first and second messages are sent to the first back-up ONU.

In some embodiments, the switch between the first OLT and the second OLT for the first ONU is performed upon reception by the first OLT of a network management command from an external entity, the network management command comprising an identifier of the first ONU.

Thus, the protection switching operation can be initiated based on a manual command, which improves the configurability of the method according to the invention.

According to some embodiments, the switch between the first OLT and the second OLT is performed upon detection by the first OLT of a failure between the first OLT and the first ONU (in the case of a trunk protection scheme) or a failure between the first OLT and an ONU (working ONU) associated with the first ONU (corresponding back-up ONU, in the case of a tree protection scheme), the failure concerning:

the reception of a REPORT message by the first OLT;
the reception of a GATE message by the first ONU or by the associated ONU;
the transmission of a REPORT message by the first ONU or by the associated ONU; or
the transmission of a GATE message by the first OLT.

Thus, the protection switching operation can be initiated based on an automatic failure detection by the first OLT, which improves the autonomy of the method according to the invention and which is compatible with both trunk and tree protection schemes. The associated ONU is used for the case of a tree configuration, in which each working ONU is associated with a corresponding back-up ONU.

According to some embodiments, the current RTT is equal to the absolute value of the difference between the first timestamp of the REPORT message and the local clock time of the given OLT.

In some embodiments, the first timestamp is coded in the REPORT message as a sequence of n bits and wherein, before sending a GATE message to the first ONU, the first threshold of the second OLT is set to a value at least equal to $2^n$.

This ensures that the timestamp drift error does not occur during switching operation by fixing the first threshold to a predefined value that can be easily calculated.

A second aspect of the invention concerns a program product recorded on a storage medium and executable by a computer in the form of a software agent. The program product includes at least one software module set up to perform the method according to the first aspect of the invention.

A third aspect of the invention concerns an Optical Line Terminal OLT of a Passive Optical Network PON comprising an other OLT, the OLT and the other OLT being connected to a plurality of Optical Network Units ONUs through at least one splitter, the OLT and the other OLT being arranged to allocate resources to the plurality of ONUs by sending GATE messages, the other OLT being by default in charge of sending GATE messages, resources being used by each ONU to transmit data or REPORT messages, each ONU of the plurality of ONUs being by default in a registered state in which the ONU is allowed to send REPORT messages after allocation of resources to the ONU, the REPORT message being sent to the OLT or to the other OLT in order to require resource allocations, each REPORT message being time stamped by the ONU with a first timestamp, the first timestamp representing the local time at which the REPORT message is sent, each given ONU being adapted to be switched in a deregistered state by a given OLT when, upon reception by the given OLT of a REPORT message from the given ONU, a difference between a current Round Trip Time RTT and a previous RTT is greater than a first threshold of the given OLT, the current RTT being determined based on the first timestamp of the REPORT message and a local clock time of the given OLT, and the previous RTT corresponding to a current RTT determined for a previously received REPORT message, an ONU in a deregistered state being not allowed to transmit REPORT messages nor data to the OLT or to the other OLT, and the first threshold of the OLT being initially set to a first initial value.

To perform a switch between the other OLT and the OLT for at least one first ONU of the plurality of ONUs, the OLT comprises:

a first setting unit to set the first threshold of the OLT to a value at least equal to a predefined maximum value of the difference between a current round trip time and a previous round trip time;
a sending unit to send a GATE message to the first ONU to allocate resources to the first ONU;
a reception unit to receive a REPORT message from the first ONU;
a second setting unit to set the first threshold of the OLT to the first initial value.

A fourth aspect of the invention relates to a first Optical Network Unit of a passive optical network comprising a first Optical Line Terminal OLT, a second OLT, a plurality of Optical Network Units ONUs including the first ONU, and at least one splitter, the first and second OLTs being connected to the plurality of ONUs through the at least one splitter, the first OLT and the second OLT being arranged to allocate resources to the plurality of ONUs by sending GATE messages, the first OLT being by default in charge of sending GATE messages, resources being used by each ONU to transmit data or REPORT messages, each GATE message sent by a given OLT being time stamped with a timestamp of the given OLT each ONU of the plurality of ONU being by default in a registered state in which the ONU is allowed to send REPORT messages after allocation of resources to the ONU, the REPORT message being sent to the first or the second OLT in order to require resource allocations, each given ONU being adapted to switch in a deregistered state when, upon reception of a given GATE message by the given ONU from the given OLT, the difference between the timestamp of the given GATE message and a local clock time of the given ONU is greater than a threshold of the given ONU, an ONU in a deregistered state being not allowed to transmit REPORT messages nor data to the first or second OLTs and the threshold of the first ONU being initially set to an initial value.

To perform a switch between the first OLT and the second OLT for the first ONU, the first ONU comprises:

a first receiving unit to receive a first message from the second OLT;
a first setting unit to set, upon reception of the first message, the threshold of the first ONU to a value at least equal to a predefined maximum difference between a local clock time and a second timestamp;
a receiving unit to receive a GATE message from the second OLT to allocate resources to the first ONU;
a transmission unit to transmit a REPORT message from the first ONU;
a second receiving unit to receive a second message from the second OLT; and
a second setting unit to set, upon reception of the second message, the threshold of the first ONU to the initial value.

A fifth aspect of the invention concerns a passive optical network comprising a first Optical Line Terminal OLT, a second OLT, a plurality of Optical Network Units ONUs and at least one splitter, the first and second OLTs being connected to the plurality of ONUs through the at least one splitter, the first OLT and the second OLT being arranged to allocate resources to the plurality of ONUs by sending GATE messages, the first OLT being by default in charge of sending GATE messages, resources being used by each ONU to transmit data or REPORT messages, each ONU of the plurality of ONU being by default in a registered state in which the ONU is allowed to send REPORT messages after allocation of resources to the ONU, the REPORT message being sent to the first or the second OLT in order to require resource allocations, each REPORT message being time stamped by the ONU with a first timestamp, the first timestamp representing the local time at which the REPORT message is sent, each given ONU being adapted to be switched in a deregistered state by a given OLT when, upon reception by the given OLT of a REPORT message from the given ONU, a difference between a current Round Trip Time RTT and a previous RTT is greater than a first threshold of the given OLT, the current RTT being determined based on the first timestamp of the REPORT message and a local clock time of the given OLT, and the previous RTT corresponding to a current RTT determined for a previously received REPORT message, an ONU in a deregistered state being not allowed to transmit REPORT messages nor data to the first or second OLTs and the first threshold of the second OLT being initially set to a first initial value.

To perform a switch between the first OLT and the second OLT for at least one first ONU of the plurality of ONUs, the second OLT comprises:

a first setting unit to set the first threshold of the OLT to a value at least equal to a predefined maximum value of the difference between a current round trip time and a previous round trip time;

a sending unit to send a GATE message to the first ONU to allocate resources to the first ONU;

a reception unit to receive a REPORT message from the first ONU;

a second setting unit to set the first threshold of the OLT to the first initial value.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

In what follows, a generic wording is used to describe both the trunk and tree protection schemes, as the invention enables to propose an OLT switching that is compatible with both schemes. Thus, first and second OLTs can be used to describe both the OLTs 10.1 and 10.2 of the tree protection scheme and the OLTs 20.1 and 20.2 of the trunk protection scheme.

As already explained, both the OLTs and the ONUs can detect the timestamp drift error.

To this end, GATE messages and REPORT messages are time stamped with respective timestamps of the OLTs and of the ONUs. Thus, when emitting a REPORT message intended to an OLT, the ONU time stamps the REPORT message with a first timestamp corresponding to the local time determined by means of a local clock of the ONU. When emitting a GATE message intended to an ONU, the OLT time stamps the GATE message with a second timestamp corresponding to the local time determined by means of a local clock of the OLT.

When an OLT receives a REPORT message, the REPORT message is parsed, for example according to the OLT Control Parser state diagram described in the IEEE802.3 standard. The first timestamp of the REPORT message is subtracted to the local time of the local clock of the OLT to obtain a current RTT. The absolute value of the difference between the current RTT and a previous RTT (corresponding to the current RTT of a previously received REPORT message) is determined to be compared to a first threshold of the OLT.

No restriction is attached to the initialization of the previous RTT (when no MPCP message has been exchanged between an ONU and an OLT). The previous RTT, upon reception of the first REPORT message, can be set to any value.

The first threshold of the OLT is defined in the IEEE802.3 standard as a value named "guardThresholdOLT". If the obtained absolute value is greater than the first threshold, then the timestamp drift error is detected by the OLT, which is arranged to switch the ONU is the deregistered state. Else, the OLT and the ONU are synchronized and the ONU remains in a registered state.

The ONU can also detect by itself the timestamp drift error. When the ONU receives a GATE message, the GATE message is parsed, for example according to the ONU Control Parser state diagram described in the IEEE802.3 standard. The absolute value of the difference between the second timestamp of the GATE message and the local time of the local clock of the ONU is determined to be compared to a second threshold of the ONU.

The second threshold of the ONU is defined in the IEEE802.3 standard as a value named "guardThresholdONU". If the obtained absolute value is greater than the first threshold, then the timestamp drift error is detected by the ONU, which is arranged to switch in the deregistered state. Else, the OLT and the ONU are synchronized and the ONU remains in a registered state.

Figure 3:
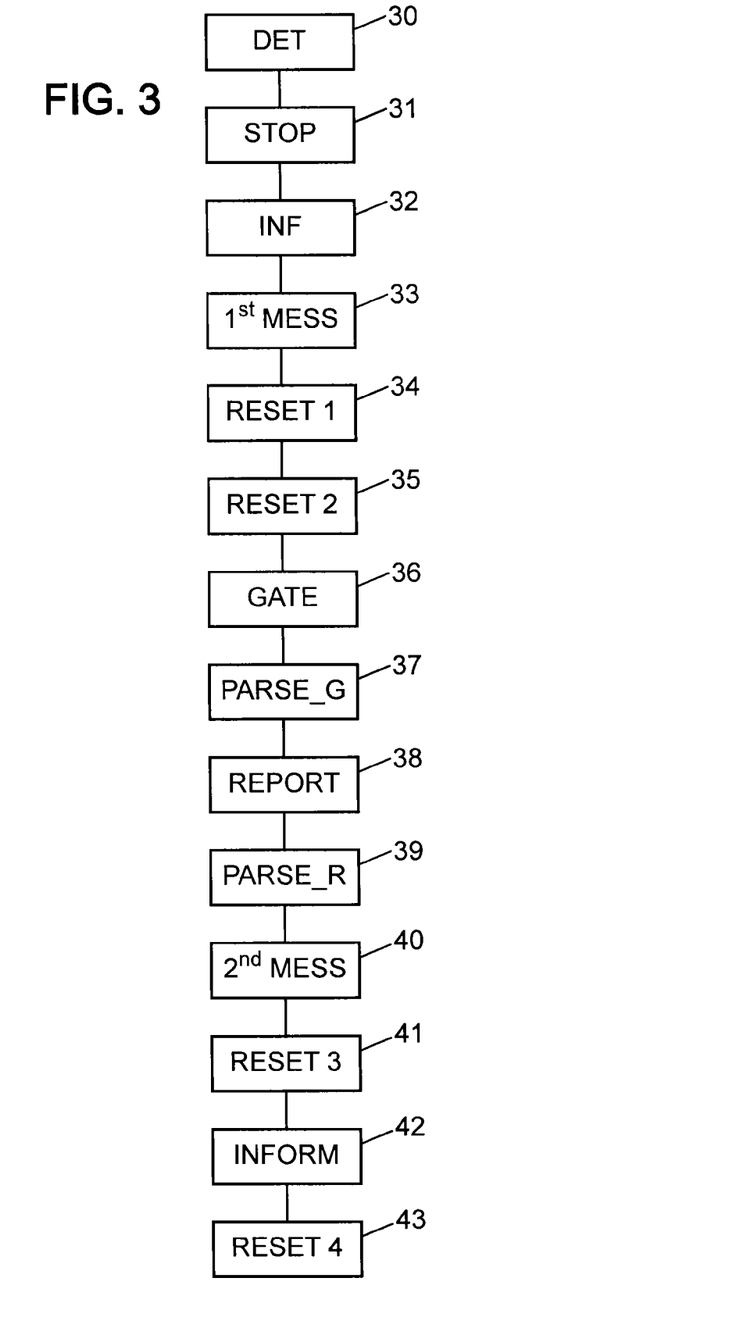
FIG. 3 is a flowchart representing the steps of a method according to some embodiments of the invention.

FIG. 3 is a flowchart representing the steps of a method according to some embodiments of the invention.

At step 30, a protection switching operation between the first OLT and the second OLT can be initiated. Different triggering events can be detected according to the invention to initiate the protection switching operation.

For example, the initiation can be automatically initiated. To this end, in a trunk configuration, when a failure happens (ONU transmission failure, ONU reception failure, OLT transmission failure or OLT reception failure) due to the network segment 13.1 of FIG. 1, no REPORT message and no data at all is received by the working OLT 10.1, which can thus detect that a protection switching operation is to be initiated. The protection switching operation is thus to be performed for all the ONUs 12.1-12.n. The ONUs 12.1-12.n have to be serviced by the back-up OLT 10.2. When a failure is due to one of the network segments 14.1-14.n, no protection switching operation is triggered as a single ONU is concerned. The single ONU is thus deregistered and can only be registered again through a discovery process.

In a tree configuration, when a failure happens due to the network segment 24.1, no REPORT message and no data at all is received by the primary OLT 20.1, which can thus detect that a protection switching operation is to be initiated. The protection switching operation is thus to be performed for all the working ONUs 22.1-22.$n$ so that the back-up ONUs 23.1 are serviced by the secondary OLT 20.1. When the failure is due to one of the network segment 26.1-26.$n$, for example network segment 26.2, the primary OLT 20.1 does not receive any REPORT message nor data from the working ONU 22.2 and can thus detect that a protection switching operation can be initiated for the working ONU 22.2 and the back-up ONU 23.2 so that the back-up ONU 23.2 is serviced by the secondary OLT 20.2.

Thus, in both configurations, the protection switching operation can be initiated by the first OLT (primary OLT 20.1 or working OLT 10.1).

According to some embodiments, the protection switching operation can also be triggered manually. It can for example be triggered by a network management command transmitted from an external entity, such as a Network Management System, to the first OLT. In this case, the network management command explicitly replaces the automatic failure detection.

At step 31, upon detection of a failure or upon reception of a command from the external entity, by the first OLT, the first OLT stops transmitting GATE messages to the ONUs for which a failure has been detected. As previously explained, if neither REPORT message nor data is received at all by the first OLT, the first OLT stops transmitting GATE messages to all the ONUs. In the case of the tree configuration, if only one working ONU (or m working ONUs, m being less than n) is concerned by the protection switching operation, the first OLT stops transmitting GATE messages to the first ONU, but go on transmitting to the ONUs that are not concerned by the protection switching operation.

In what follows, the ONUs that are concerned by the switching operation are called first ONUs. In case of a tree configuration, both a working ONU and the associated back-up ONU can be concerned by the switching operation and are called first working ONU and first back-up ONU. The first ONUs in the tree configuration are thus the first back-up ONUs, as they will replace the associated first working ONUs after the switching operation. In the trunk configuration, the first ONUs correspond to all the ONUs of the PON.

At step 32, the first OLT informs the second OLT that the protection switching operation is to be started. To this purpose, the first OLT can transmit identifiers of the first ONUs. In case of a tree configuration, the primary OLT may only send the identifiers of the first working ONUs that are concerned as the secondary OLT can deduce the associated first back-up ONUs.

At step 33, the second OLT sends a first message to the first ONUs, for example a "switch_start" OAM message (Operations, Administration and Maintenance).

At step 34, the second OLT resets the first threshold of the second OLT to a value that is large enough so that the absolute value of the difference between a current RTT and a previous RTT can not exceed the value. This value can be fixed to a predefined maximum value of the difference between a current RTT and a previous RTT. For example, if the first timestamps are coded as a sequence of n bits (for example 32) in REPORT messages, then the value can be equal to $2^n$ (for example $2^{32}$).

According to some embodiments, step 34 can be performed before or during step 33.

At step 35, the first message is received by the first ONUs. The first message permits to set the respective second thresholds of the first ONUs to a value at least equal to a predefined maximum difference between a local clock time of each first ONU and a second timestamp. For example, if the second timestamps are coded as a sequence of n bits (for example 32), then the value can be equal to $2^n$ (for example $2^{32}$).

At step 36, the second OLT sends a GATE message to each of the first ONUs, each GATE message being time stamped with a second timestamp, as already explained.

At step 37, each first ONU parses the received GATE message, for example using usual MPCP message parsing state machines such as described in the IEEE802.3 standard in the ONU Control Parser state diagram. As the second threshold has been previously reset to a maximum value, the first ONU does not switch into the deregistered state and can realign the local time of the local clock of the first ONU to the local time of the second OLT.

At step 38, as the first ONUs are still in a registered state, each first ONU can send a REPORT message to the second OLT to require resource allocations, each REPORT message being time stamped with a first timestamp, as previously explained.

At step 39, the second OLT parses each received REPORT message, for example using usual MPCP message parsing state machines such as described in the IEEE802.3 standard in the OLT Control Parser state diagram. As the first threshold of the OLT has been previously reset to a maximum value, the second OLT does not switch the first ONUs into the deregistered state.

At step 40, before sending any further GATE messages, the second OLT sends a second message to the first ONUs, for example a "switch_end" OAM message.

At step 41, the second OLT resets the first threshold to its initial value (i.e. the value defined in the IEEE802.3 standard).

At step 42, the second OLT estimates a new current RTT value based on the second timestamp contained in each REPORT message and can inform the first OLT of the end of the protection switching operation, so that the first OLT does not have to service the first ONUs in the trunk configuration and does not have to service the working ONUs associated with the first ONUs in the tree configuration.

No restriction is attached to the order in which steps 40 to 42 are performed by the second OLT.

At step 43, upon reception of the second message, each first ONU resets the second threshold to its initial value (i.e. the value defined in the IEEE802.3 standard).

Alternatively, no second message is sent to the first ONUs at step 40 and, a given duration being predefined, upon reception of the first message at step 35, the first ONU can set a timer to zero. The second threshold of the first ONU can then be reset by the first ONU to the second initial value when the timer reaches the predefined duration. These embodiments enable to reduce the number of OAM messages exchanged between the OLTs and the ONUs. The predefined duration can correspond to a maximum duration required for performing a switch between the first and second OLTs for example.

Thus, the present invention enables to avoid triggering a detection of timestamp drift error during a protection switching operation thus maintaining the concerned ONUs in a registered state. In addition, the present invention is common to the trunk and tree configurations and the switch is initiated by the first OLT (primary or working OLT). The present invention thus avoids employing an Holdover state defined in the prior art and that does not allow maintaining the concerned ONUs in a registered state. The present invention is also compatible with any triggering event that triggers the initiation of a protection switching operation. In addition, no modification of the detection of the timestamp drift error is made compared to the IEEE802.3 standard as only the thresholds are modified. To implement the method, it is assumed that the OAM process can access to the first and second thresholds. It is also assumed that the OAM messages are not timestamp checked by the first ONUs and thus, that a timestamp drift error cannot occur because of the OAM messages.

Figure 4:
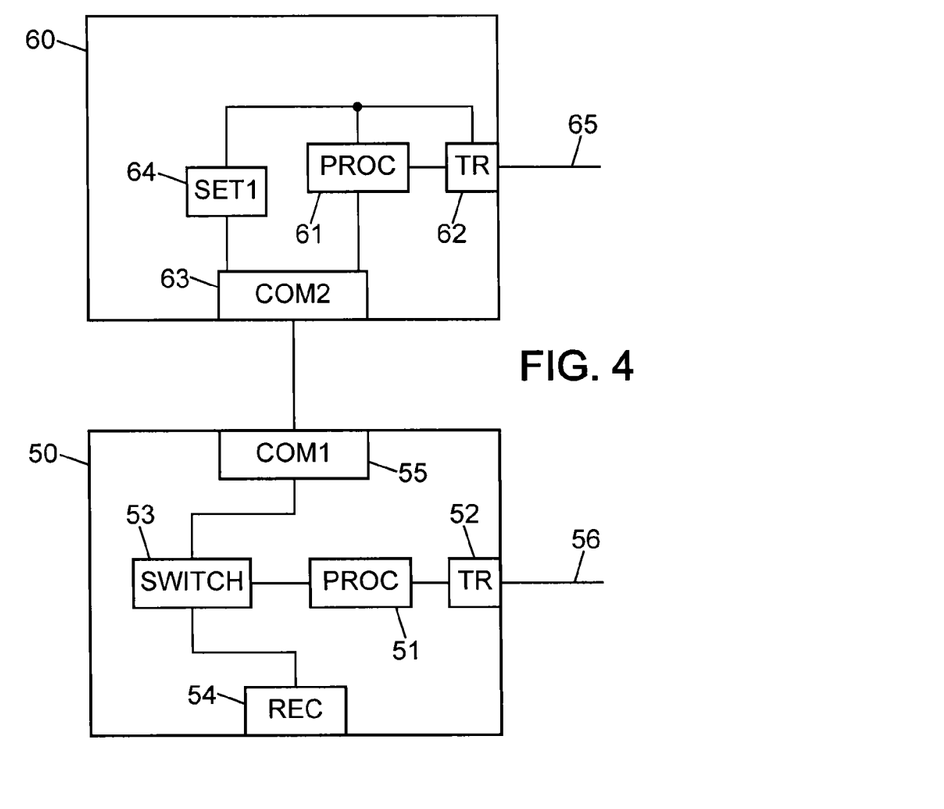
FIG. 4 represents a first OLT and a second OLT according to some embodiments of the invention.

FIG. 4 represents a first OLT 50 and a second OLT 60 according to some embodiments of the invention.

As previously explained, the invention can be implemented in a tree configuration and in a trunk configuration. Thus, the first OLT can be the working OLT 10.1 or the primary OLT 20.1 and the second OLT can be the back-up OLT 10.2 or the secondary OLT 20.2.

The first OLT 50 comprises a processing unit 51, a transmission unit 52, a switching unit 53, a reception unit 54 and a communication interface 55.

The processing unit 51 is adapted to process allocation of resources to ONUs (working ONUs for the tree configuration) based on MPCP messages, such as defined in the IEEE802.3 standard. The MPCP messages can be exchanged with the ONUs (working ONUs in the tree configuration) via the transmission unit 52. The transmission unit 52 is connected to a splitter (not represented on FIG. 4) via a network segment 56.

The processing unit 51 further comprises a local clock so that the GATE messages can be time stamped as previously explained.

The processor 51 can also detect a failure as previously explained, the failure being reported to the switching unit 53.

The reception unit 54 is adapted to communicate with an external entity, such as the Network Management System, and can thus receive a network management command to initiate a protection switching operation. The network management command can be forwarded to the switching unit 53.

The switching unit 53 is arranged to initiate a protection switching operation upon automatic detection of a failure by the processing unit 51, and to determine the first ONUs that are concerned by the operation.

The communication interface 55 is arranged to enable communications with the second OLT 60. Upon initiation of the protection switching operation, the communication interface 55 can inform the second OLT 60 of the protection switching operation start.

The processing unit 51 then stops transmitting MPCP messages to the ONUs concerned by the switching operations (all the ONUs for the trunk configuration, and the working ONUs for which a failure has been detected for the tree configuration).

The first OLT is by default in charge of exchanging the MPCP messages with the ONUs.

The second OLT 60 comprises a processing unit 61, a transmission unit 62, a communication interface 63 and a setting unit 64.

The processing unit 61 is adapted to process allocation of resources to ONUs (back-up ONUs for the tree configuration) based on MPCP messages, such as defined in the IEEE802.3 standard. The MPCP messages can be exchanged with the ONUs (working ONUs in the tree configuration) via the transmission unit 62. The transmission unit 62 is connected to a splitter (not represented on FIG. 4) via a network segment 65.

The processing unit 61 further comprises a local clock so that the GATE messages can be time stamped as previously explained.

The communication interface 63 can communicate with the first OLT 50 and can thus be informed that a protection switching operation is to be initiated. To this purpose, the communication interface 63 can receive identifiers of the ONUs for which the switching operation is to be performed. In case of a tree configuration, identifiers of working ONUs that are concerned by the switching operation can be received by the communication interface 63 and can be transmitted to the processing unit 61 so that the corresponding back-up ONUs can be determined.

The communication interface 63 can inform the setting unit 64 that a switching operation is initiated and the setting unit can set the first threshold of the OLT (that is used by the processing unit 61 to parse the MPCP messages) to the predefined maximum value of the difference between a current round trip time and a previous round trip time, as previously explained.

The processing unit 61 is adapted to send the first and second messages that have been previously described, to the first ONUs via the transmission unit 62. The transmission unit 62 is also adapted to receive the REPORT messages from the first ONUs and to forward them to the processing unit 61. When the switching operation is performed, upon reception of the REPORT messages, the setting unit 64 is arranged to reset the first threshold to its initial value.

Figure 5:
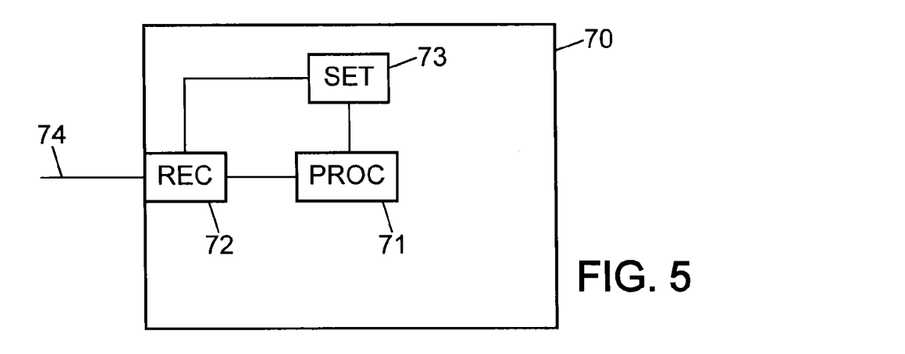
FIG. 5 illustrates an ONU according to some embodiments of the invention.

FIG. 5 illustrates an ONU 70 according to some embodiments of the invention.

The ONU 70 is considered as a back-up ONU in the case of a tree configuration.

The ONU 70 comprises a reception unit 72, a processing unit 71 and a setting unit 73.

The processing unit 71 is arranged to parse MPCP messages according to the IEEE802.3 standard for example. The reception unit 72 is connected to a PON and enables to receive GATE messages from OLTs. The reception unit 72 is connected to a splitter of the PON via a network segment 74. The reception unit also enables to transmit REPORT messages to the OLTs, the REPORT messages being generated by the processing unit 71.

The processing unit 71 further comprises a local clock so that the REPORT messages can be time stamped as previously explained.

The reception unit 72 is also arranged to receive the first and second OAM messages according to the invention. Upon reception of the first OAM message, the setting unit 73 can set the second threshold of the ONU 70 to a value at least equal to a predefined maximum difference between a local clock time and a second timestamp of a GATE message.

Upon reception of the second OAM message, the setting unit can set the second threshold of the ONU 70 to its initial value.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method for performing a switch operation between a first Optical Line Terminal OLT and a second OLT in a Passive Optical Network PON, said first and second OLTs being connected to a plurality of Optical Network Units ONUs through at least one splitter,
    said first OLT and said second OLT being arranged to allocate resources to the plurality of ONUs by sending GATE messages, the first OLT being by default in charge of sending GATE messages, the resources are used by respective ONUs to transmit data or REPORT messages,
    each ONU of the plurality of ONUs being by default in a registered state in which the ONU is allowed to send REPORT messages or data, after allocation of resources, to said ONU, the REPORT message being sent to the first or the second OLT in order to require resource allocations, each REPORT message being time stamped by the ONU with a first timestamp, said first timestamp representing the local time at which the REPORT message is sent,
    each given ONU being adapted to be switched in a deregistered state by a given OLT when, upon reception by the given OLT of a REPORT message from said given ONU, a difference between a current Round Trip Time RTT and a previous RTT is greater than a first threshold of the given OLT, said current RTT being determined based on the first timestamp of the REPORT message and a local clock time of the given OLT, and said previous RTT being an RTT determined for a previously received REPORT message,
    an ONU in a deregistered state being not allowed to transmit REPORT messages nor data to the first or second OLTs,
    the first threshold of the second OLT being initially set to a first initial value,
    wherein, to perform a switch between the first OLT and the second OLT for at least one first ONU of the plurality of ONUs, the method is performed by the second OLT and comprises:
    setting the first threshold of the second OLT to a value at least equal to a predefined maximum value;
    sending a GATE message to said first ONU to allocate resources to the first ONU; and
    after the reception of a REPORT message from the first ONU, setting the first threshold of the second OLT to the first initial value.

2. The method according to claim 1, each GATE message sent by a given OLT being time stamped with a second timestamp of the given OLT, and
    each given ONU being adapted to switch in the deregistered state when, upon reception of a given GATE message by the given ONU from the given OLT, the absolute value of the difference between the second timestamp of the given GATE message and a local clock time of the given ONU is greater than a second threshold of the given ONU,
    the second threshold being initially set to a second initial value,
    wherein the method further comprises, before sending a GATE message to the first ONU:
    sending a first message to the first ONU, said first message being adapted to set the second threshold of the first ONU to a value at least equal to a predefined maximum difference.

3. The method according to claim 2, wherein the method further comprises, after the reception of the REPORT message from the first ONU:
    sending a second message to the first ONU, said second message being adapted to set the second threshold of the first ONU to the second initial value.

4. The method according to claim 2 or 3, wherein upon reception of the GATE message by the first ONU, a local clock of the first ONU is reset based on the second timestamp of the given GATE message and wherein the first timestamp of the REPORT message is determined based on the local clock of the first ONU.

5. The method according to claim 1, the first and second OLTs being connected to the plurality of ONUs through a unique splitter, said first OLT being connected to the unique splitter via a first network segment, said second OLT being connected to the unique splitter via a second network segment, and the unique splitter being connected to each of the ONUs via a network segment,
    wherein the switch between the first OLT and the second OLT is performed for all the ONUs of the plurality of ONUs.

6. The method according to claim 1, the first OLT being connected to a first subset of working ONUs from the plurality of ONUs via a first splitter and the second OLT being connected to a second subset of back-up ONUs from the plurality of ONUs via a second splitter,
    each working ONU being associated with a corresponding back-up ONU,
    wherein the switch between the first OLT and the second OLT is performed for at least a first working ONU and a first back-up ONU associated to said first working ONU and is initiated by the first OLT upon detection of a failure between the first working ONU and the first OLT or upon reception of an identifier of the first working OLT by an external entity, wherein the method further comprises, before setting the first threshold of the second OLT:
receiving an identifier of the first working ONU from the first OLT; and
determining the first ONU as the first back-up ONU that is associated with said first working ONU,
wherein the GATE message is sent to the determined first back-up ONU and wherein the REPORT message is received from the first ONU, which was determined as the first back-up ONU.

7. The method according to claim 3 or 6, wherein the first and second messages are sent to the first ONU.

8. The method according to claim 1, wherein the switch between the first OLT and the second OLT for the first ONU is performed upon reception by the first OLT of a network management command from an external entity, said network management command comprising an identifier of the first ONU.

9. The method according to claim 1, wherein the switch between the first OLT and the second OLT is performed upon detection by the first OLT of a failure between the first OLT and the first ONU or a failure between an ONU associated with said first ONU, said failure concerning:
the reception of a REPORT message by the first OLT;
the reception of a GATE message by the first ONU or by the associated ONU;
the transmission of a REPORT message by the first ONU or by the associated ONU; or
the transmission of a GATE message by the first OLT.

10. The method according to claim 1, wherein the current RTT is equal to the absolute value of the difference between the first timestamp of the REPORT message and the local clock time of the given OLT.

11. The method according to claim 1, wherein the first timestamp is coded in the REPORT message as a sequence of n bits and wherein, before sending a GATE message to the first ONU, the first threshold of the second OLT is set to a value at least equal to 2n.

12. A non-transitory computer readable storage medium storing a program product that is executable by a computer in the form of a software agent, the program product comprising: at least one software module set up to perform the method according to claim 1.

13. An Optical Line Terminal OLT of a Passive Optical Network PON comprising an other OLT, said OLT and other OLT being connected to a plurality of Optical Network Units ONUs through at least one splitter,
said OLT and said other OLT being arranged to allocate resources to the plurality of ONUs by sending GATE messages, the other OLT being by default in charge of sending GATE messages, the resources being used by respective ONUs to transmit data or REPORT messages,
each ONU of the plurality of ONUs being by default in a registered state in which the ONU is allowed to send REPORT messages or data, after allocation of resources to said ONU, the REPORT message being sent to OLT or the other OLT in order to require resource allocations,
each REPORT message being time stamped by the ONU with a first timestamp, said first timestamp representing the local time at which the REPORT message is sent,
each given ONU being adapted to be switched in a deregistered state by a given OLT when, upon reception by the given OLT of a REPORT message from said given ONU, a difference between a current Round Trip Time RTT and a previous RTT is greater than a first threshold of the given OLT, said current RTT being determined based on the first timestamp of the REPORT message and a local clock time of the given OLT, and said previous RTT corresponding to an RTT determined for a previously received REPORT message,
an ONU in a deregistered state being not allowed to transmit REPORT messages nor data to the OLT or to the other OLT,
the first threshold of the OLT being initially set to a first initial value,
wherein, to perform a switch between the other OLT and the OLT for at least one first ONU of the plurality of ONUs, the OLT comprises:
a first setting unit to set the first threshold of the OLT to a value at least equal to a predefined maximum value; and
a sending unit to send a GATE message to said first ONU to allocate resources to the first ONU;
a receiving unit to receive a REPORT message from the first ONU;
a second setting unit to set the first threshold of the OLT to the first initial value.

14. A first Optical Network Unit of a passive optical network comprising a first Optical Line Terminal OLT, a second OLT, a plurality of Optical Network Units ONUs including said first ONU, and at least one splitter, said first and second OLT being connected to the plurality of ONUs through the at least one splitter,
said first OLT and said second OLT being arranged to allocate resources to the plurality of ONUs by sending GATE messages, the first OLT being by default in charge of sending GATE messages, the resources are used by respective ONUs to transmit data or REPORT messages,
each GATE message sent by a given OLT being time stamped with a timestamp of the given OLT,
each ONU of the plurality of ONUs being by default in a registered state in which the ONU is allowed to send REPORT messages or data, after allocation of resources, to said ONU, the REPORT message being sent to the first or the second OLT in order to require resource allocations,
each given ONU being adapted to switch in a deregistered state when, upon reception of a given GATE message by the given ONU from the given OLT, the difference between the timestamp of the given GATE message and a local clock time of the given ONU is greater than a threshold of the given ONU, an ONU in a deregistered state being not allowed to transmit REPORT messages nor data to the first or second OLTs,
the threshold of the first ONU being initially set to an initial value,
wherein, to perform a switch between the first OLT and the second OLT for said first ONU, the first ONU comprises:
a first receiving unit to receive a first message from said second OLT;
a first setting unit to set, upon reception of said first message the threshold of the first ONU to a value at least equal to a predefined maximum difference;
a receiving unit to receive a GATE message from said second OLT to allocate resources to the first ONU;
a transmission unit to transmit a REPORT message from the first ONU;
a second receiving unit to receive a second message from the second OLT; and
a second setting unit to set, upon reception of the second message, the threshold of the first ONU to the initial value.

15. A passive optical network comprising a first Optical Line Terminal OLT, a second OLT, a plurality of Optical Network Units ONUs and at least one splitter, said first and said second OLT being connected to the plurality of ONUs through the at least one splitter,
- said first OLT and second OLT being arranged to allocate resources to the plurality of ONUs by sending GATE messages, the first OLT being by default in charge of sending GATE messages, the resources being used by respective ONUs to transmit data or REPORT messages,
- each ONU of the plurality of ONUs being by default in a registered state in which the ONU is allowed to send REPORT messages or data, after allocation of resources, to said ONU, the REPORT message being sent to the first or the second OLT in order to require resource allocations, each REPORT message being time stamped by the ONU with a first timestamp, said first timestamp representing the local time at which the REPORT message is sent,
- each given ONU being adapted to be switched in a deregistered state by a given OLT when, upon reception by the given OLT of a REPORT message from said given ONU, a difference between a current Round Trip Time RTT and a previous RTT is greater than a first threshold of the given OLT, said current RTT being determined based on the first timestamp of the REPORT message and a local clock time of the given OLT, and said previous RTT corresponding to an RTT determined for a previously received REPORT message,
- an ONU in a deregistered state being not allowed to transmit REPORT messages nor data to the first or second OLTs,
- the first threshold of the second OLT being initially set to a first initial value,
- wherein, to perform a switch between the first OLT and the second OLT for at least one first ONU of the plurality of ONUs, the second OLT comprises:
- a first setting unit to set the first threshold of the OLT to a value at least equal to a predefined maximum value;
- a sending unit to send a GATE message to said first ONU to allocate resources to the first ONU;
- a reception unit to receive a REPORT message from the first ONU; and
- a second setting unit to set the first threshold of the OLT to the first initial value.

* * * * *